United States Patent [19]

Doi et al.

[11] 4,126,041

[45] Nov. 21, 1978

[54] APPARATUS FOR DETECTING THE LEVEL OF A MOLTEN METAL IN A MOLD

[75] Inventors: Yuuji Doi; Terumiti Masumori, both of Ohita, Japan

[73] Assignee: Nippon Steel Corporation, Tokyo, Japan

[21] Appl. No.: 788,963

[22] Filed: Apr. 19, 1977

[30] Foreign Application Priority Data

Apr. 19, 1976 [JP] Japan .................................. 51-44733

[51] Int. Cl.$^2$ ............................................ G01F 23/22
[52] U.S. Cl. ..................................... 73/295; 164/150; 364/557
[58] Field of Search ...................... 73/290 R, 295, 341; 164/150, 155; 340/409; 364/557

[56] References Cited

U.S. PATENT DOCUMENTS 3,204,460  9/1965  Milnes ..................... 73/295

FOREIGN PATENT DOCUMENTS 1,195,579  6/1970  United Kingdom ..................... 340/409

Primary Examiner—S. Clement Swisher

[57] ABSTRACT

An apparatus for detecting the level of molten metal such as steel in a mold which is particularly effective in continuous casting equipment. The structure is such that, even if any wire in the thermocouples arranged in the direction of the height of the mold breaks, accurate judgement of the level can be made without any difficulty by effective control of a signal processing apparatus connected thereto.

4 Claims, 4 Drawing Figures

APPARATUS FOR DETECTING THE LEVEL OF A MOLTEN METAL IN A MOLD

DETAILED DESCRIPTION OF THE INVENTION

This invention relates to an apparatus for detecting the level of molten metal in a mold, hereinafter referred to as an apparatus for detecting a mold metal level. More particularly, it relates to such an apparatus which is adapted for use in continuous casting equipment.

Apparatus for detecting a mold metal level has previously been developed, examples of which are shown in Japanese patent publication No. 23713/64 corresponding to U.S. Pat. No. 3,204,460 and Japanese patent application No. 101324/73, etc.

The former publication discloses an apparatus wherein a servo amplifier is connected between thermocouples positioned above and below the level of molten metal in a mold and a source of electric power having the opposite polarity to that of the thermocouples and a voltage which is equal to the total output voltage of said thermocouples. An electric motor driven by said source of electric power is controlled by the output of said servo amplifier to provide an analog output corresponding to the level of said molten metal in the mold.

The latter publication discloses an apparatus wherein a plurality of thermocouples are placed at predetermined intervals along the height of a side wall of a mold; thermo-electromotive voltages are introduced from said thermocouples, from which the highest thermo-electromotive voltage is selected; a thermo-electromotive voltage corresponding to the temperature at the surface of the metal in the mold which is called "standard voltage" is then calculated by predetermined ratio; based upon this standard voltage and based upon the respective positions and the thermo-electromotive voltages of the upper thermocouples of the group emitting voltages exceeding said standard voltage and of the lower thermocouples of the group emitting voltages not exceeding said standard voltage, the mold level is calculated. In this case, the calculation is made by proportional division, by introducing a signal form the thermocouple group into a digital signal processing unit and by utilizing the linear property and the uniform slope of the temperature distribution near the level of the molten metal.

In these apparatuses as described above special countermeasures must be taken to prevent "breaking of the wire" or insufficient contact of the wire of the thermocouple, hereinafter referred to generally as "breaking of the wire". The above-mentioned conventional apparatuses do not have a circuit for detecting the breaking the wire of the thermocouple. Moreover, irrespective of the breaking the wire, these thermocouples are fixed to the wall of the mold. Accordingly, when breaking of the wire occurs in these thermocouples during detecting the mold metal level, the thermo-electromotive voltage of the corresponding thermocouple is not generated, which causes an error in the detected value of the mold metal level as compared with the actual mold metal level. When there is a plurality of broken wires in sequential thermocouples, the error becomes large, which causes great difficulty in the control of the level of metal in the mold.

It is, therefore, an object of the invention to provide a new and excellent apparatus capable of advantageously overcoming the above described problems.

According to this invention, there is provided an apparatus for detecting the level of molten metal in a mold, which comprises at least one group of a plurality of thermocouples set at predetermined intervals in a vertical direction along the side wall of the mold; circuit means connected to said thermocouples for taking individual thermo-electromotive voltages from the respective thermocouples; a source of electric power and a high resistance connected in parallel with each of the thermocouples, said source of electric power having a larger voltage than the maximum thermo-electromotive voltage generated by any of the thermocouples for producing a high voltage signal at said circuit means when a wire in corresponding thermocouple is broken; and signal processing means connected to said circuit means and having a memory for receiving respective signals corresponding to the thermo-electromotive voltages from the circuit means and storing the said signals in the order of the positions of the thermocouples, a comparing and checking circuit connected to the memory for checking the signals held in the memory unit for judging whether or not any one of them is sufficiently large to indicate a broken wire in the corresponding thermocouple and if so to correct it to a value corresponding to the pattern of the thermo-electromotive voltages of thermocouples having no broken wire and selecting the maximum thermo-electromotive voltage from said pattern, and an arithmetic unit connected to said memory for calculating the thermo-electromotive voltage corresponding to the level of the source of the molten metal in the mold from the maximum voltage by using a predetermined ratio and for calculating the level of the molten metal in the mold based on the calculated voltage, the pattern of the positions of arrangement of said sound thermocouples and the pattern of the thermo-electromotive voltages corresponding thereto.

The signal processing apparatus can further comprise a control unit connected to said memory and said arithemtic unit for controlling the operation of the memory unit and the arithmetic unit.

There can be a plurality of groups of thermocouples; and a switching unit connected between said control unit and said circuit means for switching said circuit means from receiving signals from a first group of said thermocouples to receiving signals from a second group of said thermocouples where there is a predetermined number of broken wires in the first group.

The apparatus can further comprise a display unit connected to said control unit for displaying which thermocouples among a group of thermocouples has a broken wire.

One preferred embodiment of this invention is described hereinafter with reference to the accompanying drawings in which;

FIGS. 1a and 1b together are a schematic circuit diagram illustrating one example of this invention.

Figure 1A:
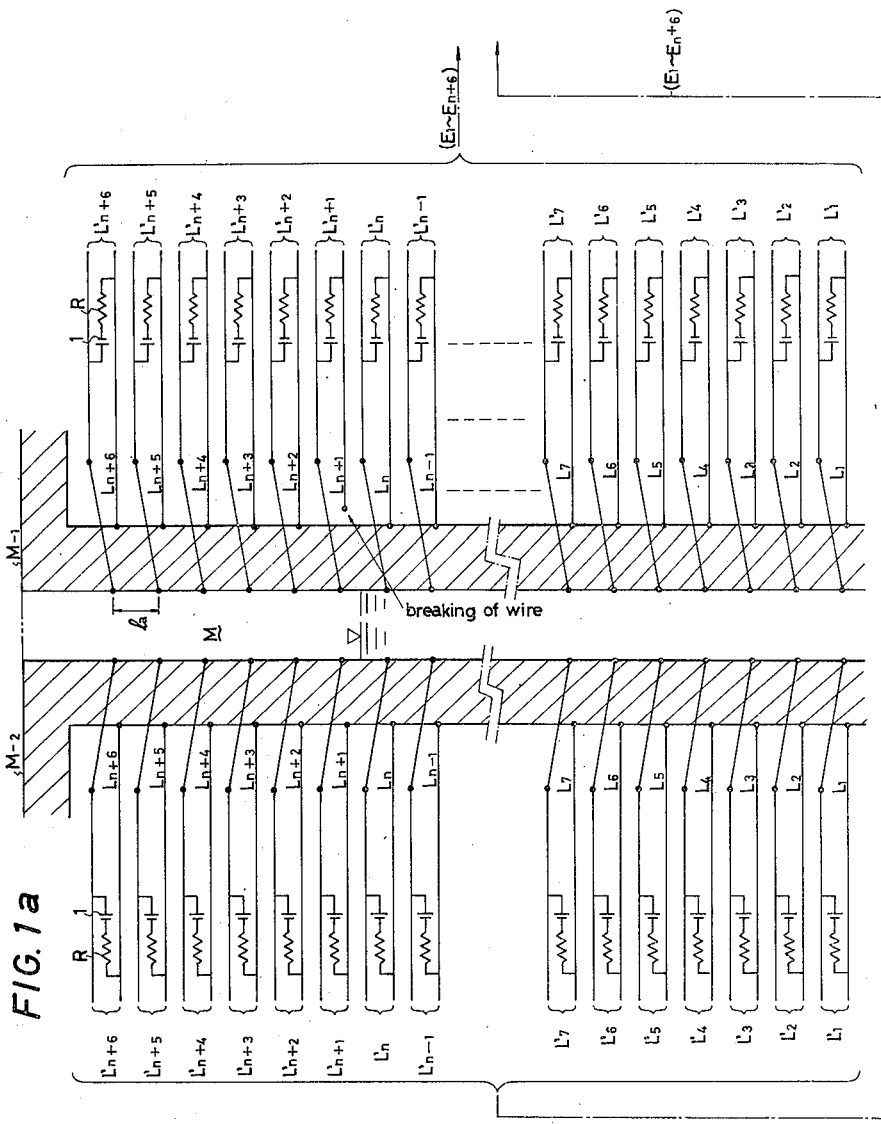
Figure 1B:
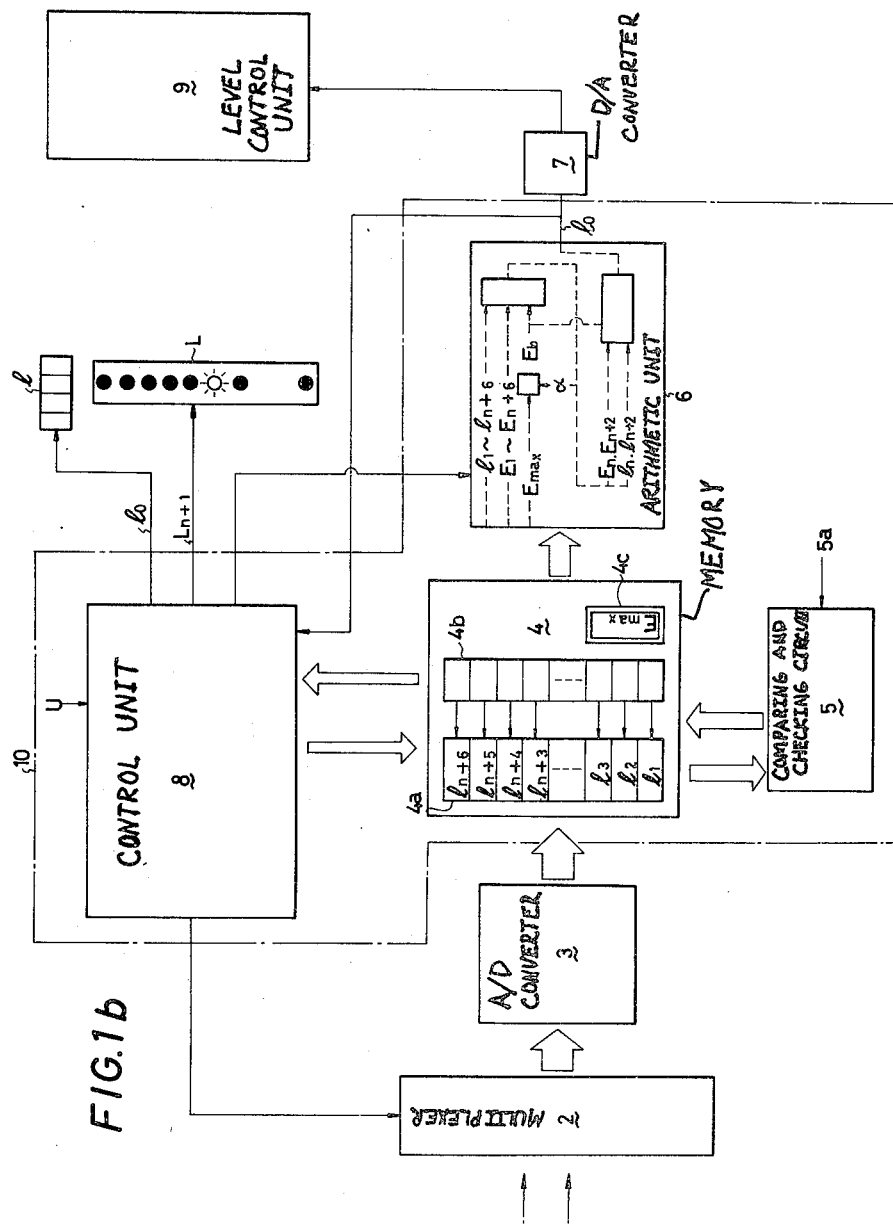

In FIGS. 1a and 1b, a group of thermocouples $L_1$ to $L_{n+6}$ are embedded or set in cartridges spaced vertically at predetermined intervals 1a (20 mm) along the short side walls M-1 and M-2 of a mold for a continuous casting apparatus.

A series of circuit $L'_1$ to $L'_{n+6}$ for providing a thermo-electromotive voltage in each thermocouple $L_1$ to $L_{n+6}$ in each side wall M-1 and M-2 are provided, and in each said circuit an electric source 1 is connected in parallel with the thermocouple through a high resistance R of 2 MΩ (megohm). The electric source has a voltage value of 2.5V which is larger than the maximum of the thermo-electromotive voltages (10 to 15 mV) generated from the thermocouples after a molten steel at high temperature is poured into the mold M. The electric source 1 and said high resistance R will constitute a circuit producing a slight electric current which does not hinder the detecting effected by the sound thermocouple. The electric source 1 is for detecting the breaking of the wire of the thermocouple and generates a voltage of 2.5 V as a signal indicating breaking of a wire when a thermocouple wire breaks and the thermo-electromotive voltage does not flow in the circuit for providing the thermo-electromotive voltage.

The respective circuits $L'_1$ to $L'_{n+6}$ described above are connected to a multiplexer 2 where the respective signals for thermo-electromotive voltages $E_1$ to $E_{n+6}$ from the group of thermocouples on the side of the mold M-1 or from the group of thermocouples on the side of the mold M-2 are read by sequential reading instructions from a control unit 8. Then these signals $E_1$ to $E_{n+6}$ which are the signals representing the thermo-electromotive voltages or breaking of a wire, if any, are introduced via an AD (analog/digital) converter 3 into a part 4a of a memory 4 in the order of positions of the thermocouples ($l_1$ to $l_{n+1}$) and are held or stored therein.

From the part 4a of memory 4 the values of the stored voltages are introduced, according to the order of positions of the thermocouples into a comparing and checking circuit (5) in accordance with the output instructions of the control unit 8. The comparing and checking circuit (5) in order in accordance with the output instructions of the control unit 8. Each this time, the circuit 5 compares each value with a value 5a corresponding to a voltage representative of a broken wire, for example, 2.0 V. If the result of the comparison of the stored voltage value is ≧ 5a this means that there is a broken wire and a value ≦ 5a which means the wire is unbroken is stored in a corrected memory part 4b of the memory 4 which is placed opposite to the part 4a. At the same time, the voltage values ≦ 5a are compared with each other and the maximum stored voltage or the maximum thermo-electromotive voltage $E_{max}$ is selected and held in a part 4c of memory 4.

Figure 2:
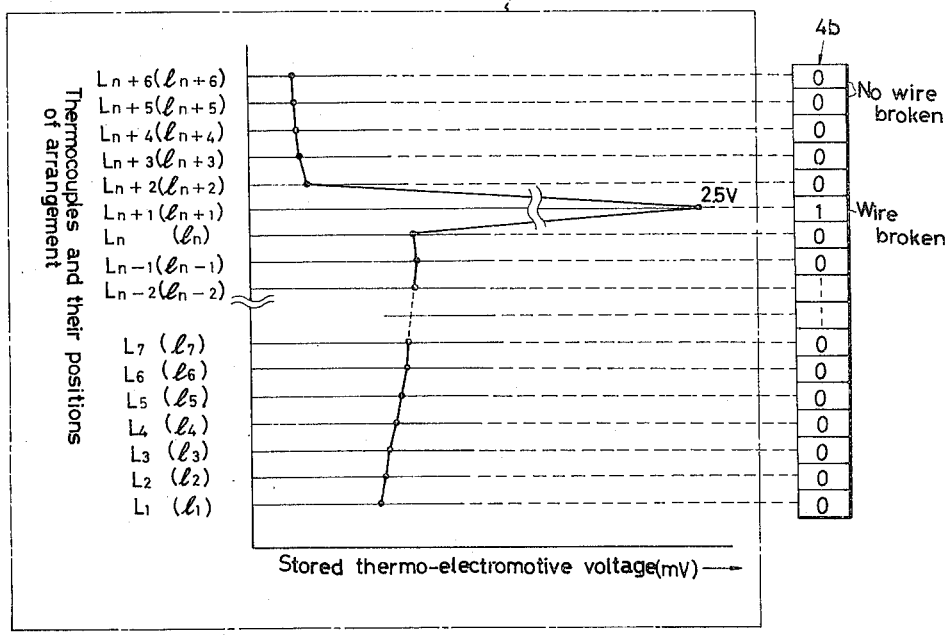
FIG. 2 is a graph showing one example of a pattern of voltage values stored in a memory and including an example of a pattern storing the result of existence of breaking of wire in the corrected memory zone.
Figure 3:
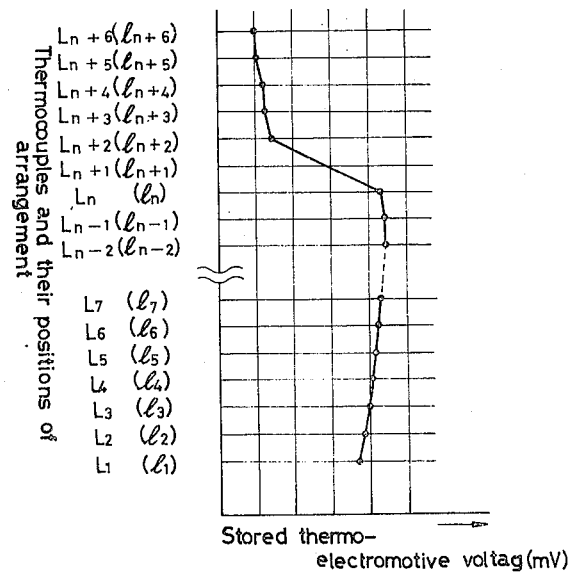
FIG. 3 is a graph showing a pattern of stored voltage values of the sound thermocouples obtained from the patterns of FIG. 2.

For example, when a thermocouple $L_{n+1}$ has a broken wire, the memory 4 corrects the pattern of the stored voltage values in the part 4a to a pattern of stored voltage values corresponding to sound thermocouples as shown in FIG. 3 by combination of a pattern (shown in the left column of FIG. 2) showing the presence or absence of any broken wire in the corrected memory part 4b, and also holds the maximum thermo-electromotive voltage $E_{max}$ of the sound thermocouples.

In the structure described above, there is provided an arithmetic unit 6 into which is introduced the contents of the memory in order according to arithmetic instructions from the control unit 8 so that the level lo of the molten metal in the mold M can be accurately calculated.

To this end the arithmeric unit 6 introduces the maximum thermo-electromotive voltage $E_{max}$ from the part 4c of memory 4, and calculates the thermo-electromotive voltage corresponding to the bath surface of the mold or the standard voltage $E_b$ by multiplying the $E_{max}$ by a predetermined ratio "α" which is on the order of 0.5 to 0.8 of $E_{max}$. On the other hand, the unit 6 into which is introduced the stored voltages of the sound thermocouples from the part 4b of memory 4 in order beginning with $E_{n+6}$, compares them with the above described standard voltage $E_b$, and takes out the thermo-electromotive voltage $E_{n+2}$ of the thermocouple $L_{n+2}$ and its height $l_{n+2}$, the thermocouple $L_{n+2}$ being the lowermost thermocouple for which the stored voltages $E_{n+6}$ to $E_{n+2}$ < $E_b$, and the unit 6 also takes out the thermo-electromotive voltage En of the thermocouple Ln and its height ln, the thermocouple Ln being the uppermost thermocouple corresponding to the stored voltages En to $E_1$. Using these values, the following equation (1) is solved to give the value lo of the molten metal surface:

$$lo = ln + \frac{E_n - E_b}{E_n - E_{n+2}} (l_{n+2} - ln) \tag{1}$$

When the thermocouple $L_{n+1}$ has no wire broken, the following equation (2) is used to give the value lo, even if a thermocouple which is substantially spaced from the molten metal surface has a broken wire:

$$lo = ln + \frac{E_n - E_b}{E_n - E_{n+1}} (l_{n+1} - l_n) \tag{2}$$

If the molten metal surface in the mold moves up or down during the operation so that a thermocouple which has a broken wire becomes positioned at the same level as the surface of the molten metal or in its vicinity, the value lo is calculated by the use of the equation (1) again.

The level value lo coming from the arithmetic unit is introduced into the control unit 8 and is introduced into a level control unit 9 via a DA (digital/analog) converter 7 as an analog level signal.

As described above, the control unit 8 gives the sequential reading instructions to the multiplexer 2 as well as the arithmetic instructions to the arithmetic unit 6 at predetermined or sampling times, while it sequentially introduces the stored contents from the memory 4 and the level value lo from the arithmetic unit 6 and supplies an output corresponding to the thermocouple $L_{n+1}$ having a broken wire and the level value lo to the respective display units L and l in response to a display instruction signal U, whereby they are displayed in the respective display units.

In the content stored in the memory for the group of thermocouples on the output-instructed side of the part 4a based on the order of positions of thermocouples of the memory 4, where the number of successive broken wires in the thermocouples $L_1$ to $L_8$ exceeds, for example, three which has been set as a limit, or when the number of successive broken wires in the thermocouples $L_9$ to $L_{n+6}$ exceeds, for example, two which has been set as the limit, the control unit 8 gives the multiplexer 2 instructions to switch to another group of thermocouples, e.g. from the group on the side M-1 of the mold to the groun on the side M-2.

In FIGS. 1a and 1b, the line 10 encloses parts constituting a digital signal processing apparatus containing the memory 4, the comparing and checking circuit 5, the arithmetic unit 6 and the control unit 8.

As set forth hereinabove, the apparatus for detecting the level of molten metal in a mold according to this invention, which is particularly adapted for use in mold level of this invention, particularly adapted for use in the continuous casting equipment, can indicate broken wires of any thermocouple, and always provides a pattern of arrangement of sound thermocouples as well as the pattern of the thermo-electromotive voltages corresponding thereto, so that it can detect the level of molten metal accurately based thereupon under advantageous control.

We claim:

1. An apparatus for detecting the level of molten metal in a mold, which comprises:
   at least one group of a plurality of thermocouples set at predetermined intervals in a vertical direction along the side wall of the mold; circuit means connected to said thermocouples for taking individual thermo-electromotive voltages from the respective thermocouples;
   a source of electric power and a high resistance connected in parallel with each of the thermocouples, said source of electric power having a larger voltage than the maximum thermo-electromotive voltage generated by any of the thermocouples for producing a high voltage signal at said circuit means when a wire in corresponding thermocouple is broken; and
   signal processing means connected to said circuit means and having a memory for receiving respective signals corresponding to the thermo-electromotive voltages from the circuit means and storing the said signals in the order of the positions of the thermocouples, a comparing and checking circuit connected to the memory for checking the signals held in the memory unit for judging whether or not any one of them is sufficiently large to indicate a broken wire in the corresponding thermocouple and if so to correct it to a value corresponding to the pattern of the thermo-electromotive voltages of thermocouples having no broken wire and selecting the maximum thermo-electromotive voltage from said pattern, and an arithmetic unit connected to said memory for calculating the thermo-electromotive voltage corresponding to the level of the surface of the molten metal in the mold from the maximum voltage by using a predetermined ratio and for calculating the level of the molten metal in the mold based on the calculated voltage, the pattern of the positions of arrangement of said sound thermocouples and the pattern of the thermo-electromotive voltages corresponding thereto.

2. An apparatus according to claim 1, in which said signal processing apparatus further comprises a control unit connected to said memory and said arithmetic unit for controlling the operation of the memory unit and the arithmetic unit.

3. An apparatus according to claim 1, in which there is a plurality of groups of thermocouples; and a switching unit connected between said control unit and said circuit means for switching said circuit means from receiving signals from a first group of said thermocouples to receiving signals from a second group of said thermocouples where there is a predetermined number of broken wires in the first group.

4. An apparatus according to claim 1, which further comprises a display unit connected to said control unit for displaying which thermocouples among a group of thermocouples has a broken wire.

* * * * *